Feb. 23, 1960     E. R. THOMPSON, SR     2,925,829
BELLOWS
Filed Sept. 11, 1958
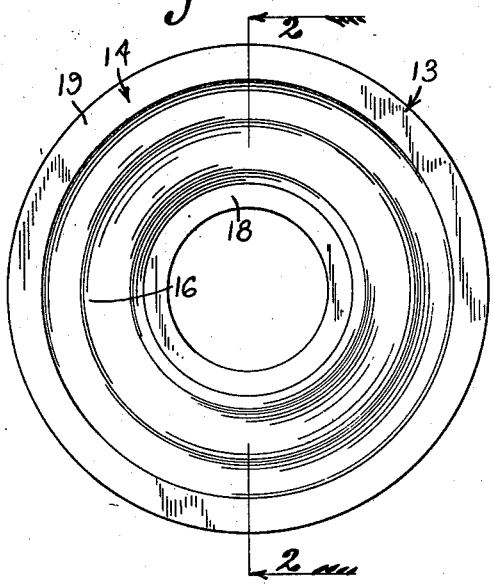
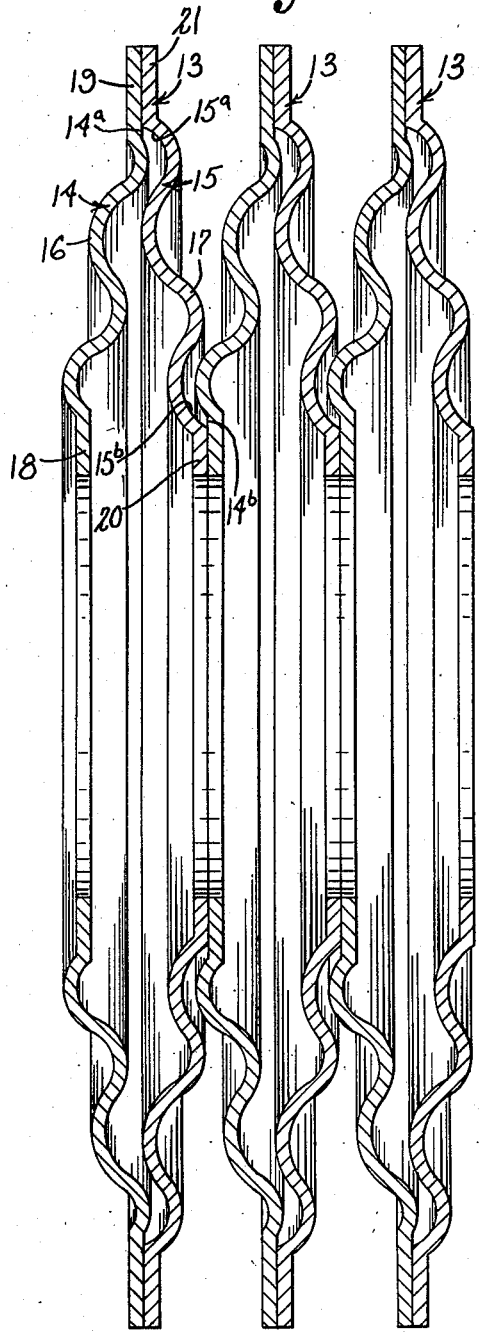
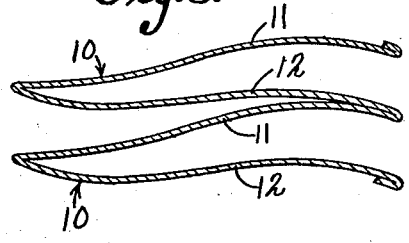
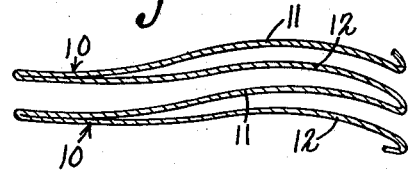
INVENTOR
Elliot R. Thompson, Sr.
BY *Rockwell & Bartholow*
ATTORNEYS

United States Patent Office 2,925,829
Patented Feb. 23, 1960

2,925,829
BELLOWS

Elliot R. Thompson, Sr., Windsor, Conn., assignor to The Belfab Corporation, Agawam, Mass., a corporation of Florida Application September 11, 1958, Serial No. 760,412

6 Claims. (Cl. 137—796)

This invention relates to bellows and relates more particularly to high pressure, welded metal bellows of the nesting type employed extensively for instrumentation and other uses on aircraft and missiles but not limited to such uses. In such applications the bellows must operate at various altitudes and, therefore, be subjected to changing external pressures as well as changing internal pressures.

Heretofore bellows of this type have been open to the objection that when subjected to changing pressures, especially rapid changes in pressures, the effective diameters of the bellows would change and, therefore, the results effected by the bellows would also change. This was found to be a serious flaw and resulted, for example, in incorrect instrument readings. It was found that if the effective diameter of a bellows increased an instrument reading would be inaccurate and would be too high, while if the effective diameter was decreased the measured reading would, again, be incorrect but would be too low. Usually it is desirable to maintain a linear relationship between the pressures which are to be measured by a bellows and the instrument reading which is effected by the operation of the bellows. The object of the invention is to provide a welded metal bellows of the nesting type, which strongly and effectively resists forces tending to change its effective diameter.

In the drawing:

Fig. 1 is an end view of a bellows embodying the invention;

Fig. 2 is an enlarged sectional view taken on line 2—2 of Fig. 1;

Fig. 3 is a fragmentary longitudinal sectional view of a conventional bellows showing the operation of the bellows under certain pressure conditions; and Fig. 4 is a view similar to Fig. 3 showing the operation of the conventional bellows under other pressure conditions.

For the purpose of simplifying the description and for a better understanding of the invention and the problems which were encountered, the conventional nesting bellows (see Figs. 3 and 4) will be described first. This bellows, which is shown only by way of example, has only two flanges but it will be understood that the bellows may have any desired number of flanges, the flanges being indicated at 10. Each flange 10 is constructed from two diaphragm elements 11 and 12 which are so shaped that they tend to nest with one another when the bellows tends to collapse. For this purpose the diaphragm elements, which may be formed of flexible annular plate members, are undulated or corrugated, the undulations or corrugations of the diaphragm element 11 corresponding to the corrugations of the diaphragm element 12. To form the flanges 10 and to connect the flanges to one another the diaphragm elements are welded together alternately at their inner and outer margins, preferably by arc welding the material so that the material of one diaphragm element fuses with the material of the adjoining diaphragm element. This provides a very strong connection between the diaphragm elements. When the internal and external pressures on the bellows are approximately equal the outer marginal portions of the elements 11 and 12 of each flange adjacent the weld which interconnects them, tend to be separated to approximately the extent indicated in Fig. 3, while the inner margins adjacent the corresponding weld tend to be separated to the extent indicated in Fig. 4. However, owing to this construction, when there is an increase, especially a rapid increase, in the internal pressure in the bellows the last-mentioned marginal portions of the diaphragm elements tend to squeeze together in the manner shown in Fig. 3, thereby changing the effective diameter of the bellows, particularly with reference to external pressures on the bellows. Conversely, when there is an increase in the external pressure applied to the bellows the outer marginal portions of the diaphragm elements tend to squeeze together in the manner indicated in Fig. 4 thereby changing the effective diameter of the bellows, particularly with reference to the internal pressure thereon. The changes in the effective area of the bellows throw out instruments, for example, which may be operated by the bellows. It is manifest that this may be extremely dangerous in such applications as aircraft, for example.

To overcome this problem or tend to resolve it very effectively, I have devised the bellows shown in Figs. 1 and 2 of the drawings by way of example. In the illustrated form the bellows is shown per se and consists of three flanges 13. However, it will be understood that the bellows may be operatively associated with any suitable instrument or mechanism and may have any number of flanges. Each flange 13 includes a diaphragm element 14 and a diaphragm element 15. The diaphragm elements 14 and 15 are formed from flexible annular plates of metal, each having a plurality of reversely arranged curves therein forming rather sharp annular corrugations. The corrugations of the element 14 are indicated at 16, while the corrugations of the element 15 are indicated at 17. Throughout the greater part thereof the corrugations 16 correspond to the corrugations 17 so that the diaphragm elements 14 and 15 have, in general, a nesting relationship to one another.

The diaphragm element 14 has a flat inner marginal portion, as at 18, and a flat outer marginal portion, as at 19. The diaphragm element 15 has a flat inner marginal portion, as at 20, which is of less depth than the marginal portion 18, and the element 15 has a flat outer marginal portion, as at 21, of less depth than the marginal portion 19. To form the bellows successive diaphragm elements are welded together alternately at their inner and outer margins, preferably by arc welding the material, so that the material of one diaphragm element fuses with the material of the adjoining diaphragm element to form a very strong joint. This type of joint is far superior to a joint which includes spacer elements between the respective diaphragm elements and welded thereto. Furthermore, the omission of spacers between the respective diaphragm elements tends to reduce the bulk of the bellows. As shown in Fig. 2, the diaphragm elements 14 and 15 have substantially the same diametric dimensions and the outer marginal portions of the elements 14 are approximately flush with the corresponding diaphragm elements 15, while the inner marginal portions of the diaphragm elements 14 are substantially flush with the inner marginal portions of the corresponding diaphragm elements 15.

To tend to prevent the outer marginal portion of each bellows flange 13 from being collapsed by external pressure, that is the portion of the flange directly inward and adjacent the outer weld, the diaphragm elements 14 and 15 of the flange are provided in this area with nonconforming inner surface portions, indicated at 14ᵃ and 15ᵃ respectively. In the form of the invention illustrated only by way of example in the drawing, the nonconforming surface 14ᵃ is provided by an inward straight extension of the flat marginal portion 19 of the element 14 which is welded to the corresponding portion of the element 15. The nonconforming surface 15ᵃ is formed by a continuation or extension of the outermost corrugation of the element 15 a distance past the corresponding corrugation of the element 14, as shown in Fig. 2. As shown in the last-mentioned view, the curved or tapered surface 15ᵃ terminates at its outer extremity at a rather sharp inclination to the straight extension 14ᵃ of the marginal portion 19. These nonconforming surfaces of the diaphragm elements very effectively tend to prevent occlusion in the bellows in this region when there is an external force applied to the bellows tending to press the diaphragm elements together in this region. The curvature of the outermost corrugation of the diaphragm element 15 also facilitates resistance to this compressive force.

The arrangement of the adjoining inner marginal portions of the diaphragm elements 14 and 15 is substantially identical to the arrangement of the outer marginal portions to strongly resist complete collapse of the bellows in this region occasioned by pressure within the bellows. To this end each diaphragm element 15 is provided with a nonconforming externally curved surface 15ᵇ similar to the curved surface 15ᵃ described above, while each diaphragm element 14 is in the corresponding region provided with a substantially flat external surface 14ᵇ formed as an inward extension of the flat marginal portion 18 and similar to the surface 14ᵃ described above. The inner and outer pairs of nonconforming surfaces may be easily formed by providing the diaphragm element 15 with flat inner and outer marginal portions of less depth than the inner and outer marginal portions of the diaphragm element 14, and by extending the corrugation of the diaphragm element 15 to a greater depth than the depth of the corrugation of the diaphragm element 14, that is, in a radial direction.

In view of the foregoing disclosure it will be manifest that a bellows is provided which very strongly and effectively resists changes in its effective diameter occasioned by changes in both external and internal pressures. The bellows is of simple and economical construction and yet is very efficient and dependable in operation. Furthermore, the bellows, which is of the nesting type, is capable of a wide range of movement.

While only one form of the bellows has been illustrated in the drawing and described above, it will be apparent to those versed in the art that the bellows may take other forms and is susceptible of various changes in details without departing from the principles of the invention and the scope of the appended claims.

What I claim is:

1. A nesting bellows comprising a plurality of pairs of flexible annular diaphragm elements of metal arranged in opposing relationship, each element having substantially flat inner and outer margins and having therebetween a radially central portion of sharply corrugated form, one element of each pair having the substantially flat margins thereof of shorter radial dimensions than the substantially flat margins of the other element, the diaphragm elements having substantially the same inner and outer diameters and said ones of the diaphragm elements being arranged alternately with said others of the elements in the bellows, the corrugated portions of the elements substantially corresponding with one another in the area where the corrugations are in opposing relationship so that the elements may tend to nest in this area, said substantially flat outer margins of each pair of diaphragm elements being fused together in substantially flush relation and said substantially flat inner margins of each pair of diaphragm elements being fused in substantially flush relation to the inner margins of the respective diaphragm elements of the adjoining pairs, whereby the corrugations of said ones of the elements overlap said substantially flat inner and outer margins of said others of the elements and provide nonconforming surfaces to resist collapse of the diaphragm elements in these regions.

2. A nesting bellows comprising a plurality of flanges in adjoining relation to one another and each formed by a pair of flexible annular diaphragm elements of metal arranged in opposing relationship, the outer edges of the diaphragm elements of each pair being fused together and the inner edges of the diaphragm elements being fused to the inner edges of the respective diaphragm elements of the adjoining flanges, the diaphragm elements of each pair having radially central portions of undulated form and of substantial area, the undulations in the central portion of one element of each pair substantially corresponding to the undulations in the central portion of the other element of the pair so that the diaphragm elements may tend to nest with one another in this region, the diaphragm elements of each pair having relatively narrow nonconforming portions of annular form radially outwardly of said central portions adjacent the respective fused outer edges and extending to said central portions in opposing relation to one another tending to resist the collapse of one element of a pair of diaphragms with the other, one nonconforming portion being formed by an extension of the undulation of the corresponding element and the other nonconforming portion being formed by a flat part disposed in a plane substantially at right angles to the axis of the bellows.

3. A nesting bellows comprising a plurality of flanges in adjoining relation to one another and each formed by a pair of flexible annular diaphragm elements of metal arranged in opposing relationship, the outer edges of the diaphragm elements of each pair being fused together and the inner edges of the diaphragm elements being fused to the inner edges of the respective diaphragm elements of the adjoining flanges, the diaphragm elements of each pair having radially central portions of undulated form and of substantial area, the undulations in the central portion of one element of each pair substantially corresponding to the undulations in the central portion of the other element of the pair so that the diaphragm elements may tend to nest with one another in this region, the diaphragm elements of each pair having relatively narrow nonconforming portions of annular form radially inwardly of said central portions and adjacent the respective inner edges and extending to said central portions, to resist collapse of one element of a pair of diaphragms with the adjoining element of the next pair, the nonconforming portion of said one of the elements being formed by an extension of the undulations therein, and the nonconforming portion of said adjoining element being formed by a susbstantially flat part disposed in a plane substantially at right angles to the axis of the bellows.

4. A nesting bellows comprising a plurality of flanges in adjoining relation to one another and each formed by a pair of flexible annular diaphragm elements of metal arranged in opposing relationship, the outer edges of the diaphragm elements of each pair being fused together and the inner edges of the diaphragm elements being fused to the inner edges of the respective diaphragm elements of the adjoining flanges, the diaphragm elements of each pair having radially central portions of undulated form and of substantial area, the undulations in the central portion of one element of each pair substantially corresponding to the undulations in the central portion of the other element of the pair so that the diaphragm elements may tend to nest with one another in this region, the diaphragm elements having relatively narrow nonconforming portions of annular form radially inwardly and outwardly of said central portions and adjacent the respective inner and outer edges and extending to said central portions, to resist collapse of one element of a pair of diaphragms with the other and the collapse of one element of a pair with the adjoining element of the next pair, said one of the elements having the inner and outer nonconforming portions thereof formed by an extension of the undulations therein, and said adjoining element and said other element having their inner and outer nonconforming portions formed by substantially flat parts disposed in planes substantially at right angles to the axis of the bellows.

5. A nesting bellows comprising a plurality of flanges in adjoining relation to one another and each formed by a pair of flexible annular diaphragm elements of metal arranged in opposing relationship, the outer edges of the diaphragm elements of each pair being fused together and the inner edges of the diaphragm elements being fused to the inner edges of the respective diaphragm elements of the adjoining flanges, the diaphragm elements of each pair having radially central portions of undulated form and of substantial area, the undulations in the central portion of one element of each pair substantially corresponding to the undulations in the central portion of the other element of the pair so that the diaphragm elements may tend to nest with one another in this region, the diaphragm elements having relatively narrow nonconforming portions of annular form radially inwardly and outwardly of said central portions and adjacent the respective inner and outer edges and extending to said central portions, to resist collapse of one element of a pair of diaphragms with the other and the collapse of one element of a pair with the adjoining element of the next pair, said one of the elements having the inner and outer nonconforming portions thereof formed by concave surfaces constituted by continuations of the undulations in the element, and the nonconforming portions of said other element and said adjoining element being formed by substantially flat parts disposed in planes substantially at right angles to the axis of the bellows.

6. A nesting bellows comprising a plurality of pairs of flexible annular diaphragm elements of metal arranged in opposing relationship, each element having substantially flat inner and outer margins and having therebetween a radially central portion of corrugated form, one element of each pair having the substantially flat margins thereof of shorter radial dimensions than the substantially flat margins of the other element, said ones of the diaphragm elements being arranged alternately with said others of the elements in the bellows, the corrugated portions of the elements substantially corresponding with one another in the area where the corrugations are in opposing relationship so that the elements may tend to nest in this area, said substantially flat outer margins of each pair of diaphragm elements being fused together and said substantially flat inner margins of each pair of diaphragm elements being fused to the inner margins of the respective diaphragm elements of the adjoining pairs, whereby the corrugations of said ones of the elements overlap said substantially flat inner and outer margins of said others of the elements and provide nonconforming surfaces to resist collapse of the diaphragm elements in these regions.

References Cited in the file of this patent

UNITED STATES PATENTS

| | | |
|---|---|---|
| 966,790 | Bristol | Aug. 9, 1910 |
| 1,454,459 | Stalker et al. | May 8, 1923 |
| 1,786,506 | Ray | Dec. 30, 1930 |
| 2,303,911 | Clark | Dec. 1, 1942 |
| 2,729,243 | Senn | Jan. 3, 1956 |

FOREIGN PATENTS

| | | |
|---|---|---|
| 387,902 | Great Britain | Feb. 16, 1933 |